United States Patent
Vanmoor

(10) Patent No.: US 6,632,145 B2
(45) Date of Patent: Oct. 14, 2003

(54) FLUID DISPLACEMENT PUMP WITH BACKPRESSURE STOP

(76) Inventor: Arthur Vanmoor, 22 SE. 4 St., Boca Raton, FL (US) 33432

( * ) Notice: Subject to any disclaimer, the term of this patent is extended or adjusted under 35 U.S.C. 154(b) by 0 days.

(21) Appl. No.: 10/036,036

(22) Filed: Dec. 31, 2001

(65) Prior Publication Data

US 2002/0068002 A1 Jun. 6, 2002

Related U.S. Application Data

(60) Continuation-in-part of application No. 09/780,302, filed on Feb. 9, 2001, now Pat. No. 6,530,365, which is a division of application No. 09/503,665, filed on Feb. 14, 2000, now Pat. No. 6,257,195.

(30) Foreign Application Priority Data

Aug. 27, 2001 (NL) .............................. 1018833
Nov. 9, 2001 (NL) .............................. 1019337
Nov. 13, 2001 (NL) .............................. 1019362

(51) Int. Cl.$^7$ ................................ F04C 2/16
(52) U.S. Cl. ................... 468/201.3; 418/195
(58) Field of Search ............... 418/201.1, 201.3, 418/195

(56) References Cited

U.S. PATENT DOCUMENTS 1,698,802 A * 1/1929 Montelius ............... 418/201.3
2,908,226 A * 10/1959 Rich et al. ............... 418/201.3
2,931,308 A * 4/1960 Luthi ....................... 418/201.1
3,198,582 A * 8/1965 Zalis ....................... 418/201.1
4,548,562 A * 10/1985 Hughson ................. 418/201.3
5,120,208 A * 6/1992 Toyoshima et al. ..... 418/201.3
6,361,289 B1 * 3/2002 Hennes et al. .......... 418/201.3

FOREIGN PATENT DOCUMENTS

FR 981576 * 5/1951 ............... 418/201.1
GB 240285 * 10/1925 ............... 418/201.3
GB 980699 * 1/1965 ............... 418/201.3

* cited by examiner

Primary Examiner—Michael Koczo
(74) Attorney, Agent, or Firm—Laurence A. Greenberg; Werner H. Stemer; Ralph E. Locher

(57) ABSTRACT

The fluid displacement pump enables substantially continuous pumping from a low-pressure side to a high-pressure side substantially without any backflow or backpressure pulsations. Liquid or gas is injected to the high-pressure side by way of mutually intertwined worm spindles that form a fluidtight displacement system. The blades of the impeller system are slightly curved from the inside out, i.e., from their axles to their periphery, so as to ensure a tight seal between adjacent blades. The orientation of the blades is almost flat, i.e., their attack angle relative to backpressure is close to perpendicular so that they will turn quite freely in the forward direction, but will not be turned backwards by a pressurized backflow. The impeller rotation that is introduced via the spindle shafts nevertheless leads to a volume displacement towards the high-pressure side, for instance, towards a chamber to be pressurized or to be subjected to equal pressure.

15 Claims, 7 Drawing Sheets

FLUID DISPLACEMENT PUMP WITH BACKPRESSURE STOP

CROSS-REFERENCE TO RELATED APPLICATION

This is a continuation-in-part of my copending application Ser. No. 09/780,302, filed Feb. 9, 2001, now U.S. Pat. No. 6,530,365; which was a division of my earlier application No. Ser. No. 09/503,665, filed Feb. 14, 2000, now U.S. Pat. No. 6,257,195. The contents of my earlier documents are herein incorporated by reference.

BACKGROUND OF THE INVENTION

Field of the Invention

The invention relates to a fluid pump for pumping liquid and/or gas phase materials. The fluid pump is useful, as described in my earlier applications, in the context of an output system of an internal combustion engine or a turbine engine and an input system for injecting fluid into the combustion process. The input system, in that case, includes a displacement pump, specifically for use with air and water, which can be utilized as a gas compression pump in the internal combustion engine and the turbine.

Fluid displacement pumps are subject to a variety of applications in engineering. For instance, such pumps are utilized in compression systems such as air compressors and as fluid pumps. For example, British Patent Specification 265,659 to Bernhard discloses an internal combustion engine with fuel pressurization separate from the combustion chamber. There, fuel is pressurized in a compressor and the pressurized fuel is fed from the pump to the engine through a port assembly.

U.S. Pat. No. 1,287,268 to Edwards discloses a propulsion system for a motor vehicle. There, a compressor formed with mutually interengaging helical impellers pumps to an internal combustion engine which is also formed with mutually interengaging helical impellers. The internal combustion engine drives a generator, which pumps hydraulic fluid to individual hydraulic motors that are disposed at each of the wheels. The impellers of Edwards are formed with "flat" blades of a constant thickness from the axle radially outward to their outermost tip.

The efficiency of fluid pumps with interengaging impeller blades is dependent on the seal that is in effect formed between the blades. While the outer seal is relatively easily obtained with a corresponding housing wall, the inner seal between the blades, i.e., at the location where the blades overlap is rather difficult to obtain. In the prior art system of Edwards, for example, the flat blades do not sufficiently seal against one another and the corresponding efficiency of the double impeller pump is therefore relatively low. Certain applications of the fluid pump require a better seal and better backflow prevention.

SUMMARY OF THE INVENTION

It is an object of the invention to provide a fluid displacement pump, which overcomes the disadvantages of the heretofore-known devices and methods of this general type and which is further improved in terms of efficiency and backflow prevention, and which allows essentially continuous pumping output with negligible backflow.

With the foregoing and other objects in view there is provided, in accordance with the invention, a fluid displacement pump, comprising:

a housing formed with a chamber having a wall defined by two parallel, mutually intersecting cylindrical openings defining respective cylinder axes; and two axles respectively disposed at and rotatably mounted about respective axes coaxial with said cylinder axes, said axles each carrying a helically rising blade sealing against said wall of said housing and engaging into one another so as to form a substantially completely closed wall within said chamber during a rotation of said axles;

said blades having a decreasing thickness from said axles to an outer periphery thereof.

In an alternative embodiment of the invention, the blades increase in thickness from the axle outward. Details of the alternative embodiment will emerge from the following description of the figures.

In accordance with an added feature of the invention, said blades have a rounded surface extending from said axle to an outer periphery thereof.

In accordance with an additional feature of the invention, said rounded surface is defined by a radius of curvature in a radial section of said blades, said radius being greater than a diameter of said blades. Preferably, the radius of curvature is approximately three times the diameter of said blades.

In accordance with another feature of the invention, said blades are trapezoidal as seen in axial section, with mutually opposite surfaces steadily merging towards one another from said axle to the outer periphery.

With the above and other objects in view there is also provided, in accordance with the invention, a fluid displacement pump, comprising:

a housing formed with a chamber having a wall defined by two parallel, mutually intersecting cylindrical openings defining respective cylinder axes; and two axles respectively disposed at and rotatably mounted about respective axes coaxial with said cylinder axes, said axles each carrying a helically rising blade sealing against said wall of said housing and engaging into one another so as to form a substantially completely closed wall within said chamber during a rotation of said axles;

said blades having a given thickness and helically rising along said axle with a given lead substantially greater than the given thickness of said blades.

In a preferred embodiment, the ratio of the spacing between the blade turns (the lead minus the blade thickness) to the thickness of the blades lies between 5/4 and 2.

The axles are preferably cylindrical, i.e., their peripheral wall is defined by mutually parallel lines.

In accordance with an added feature of the invention, the rounded surface is defined by a radius of curvature in a radial section of the blades, the radius being greater than a diameter of the blades. In a preferred embodiment, the radius of curvature is approximately three times the diameter of the blades.

In accordance with another feature of the invention, the blade on each of the axles has a rise angle along the helix of approximately 7° and the blades are substantially trapezoidal in radial section from the axle to a periphery thereof.

In accordance with again an added feature of the invention, the blade of one helix of the double helix are spaced apart by a distance defined by the blades of the other helix of the double helix.

In accordance with a concomitant feature of the invention, the blades enclose an angle of between approximately 45° and almost 90° with the cylinder axes.

Other features which are considered as characteristic for the invention are set forth in the appended claims.

Although the invention is illustrated and described herein as embodied in a fluid displacement pump with backflow stop, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
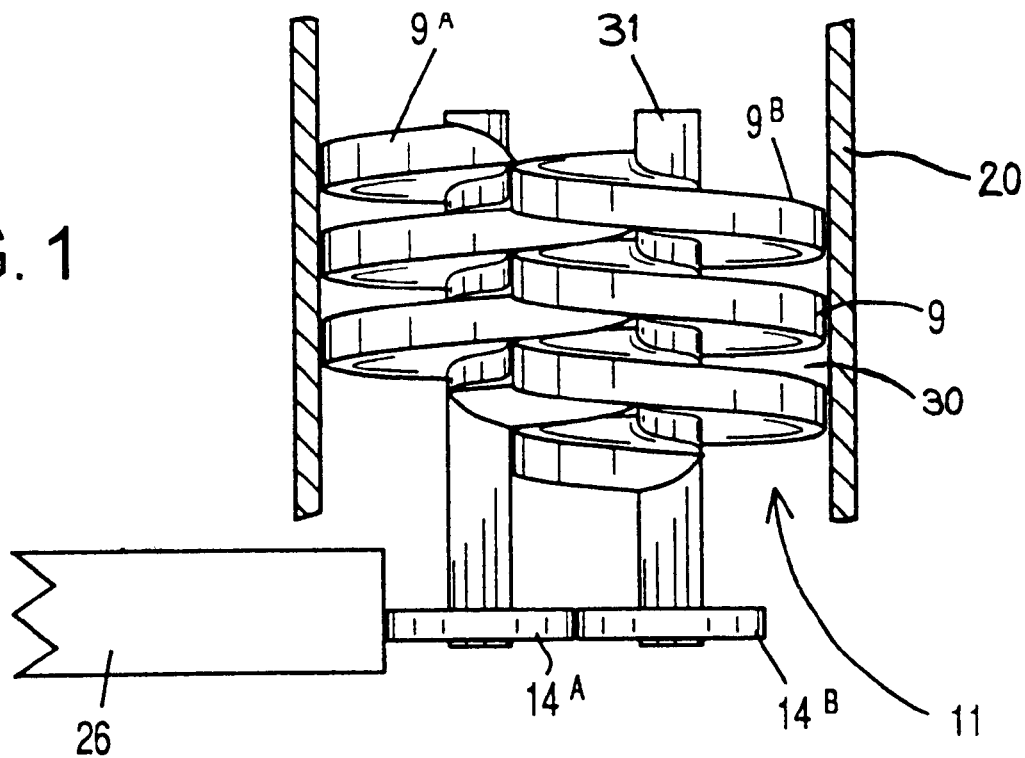
FIG. 1 is a partial sectional and side-elevational view of a fluid displacement pump according to the invention.

Referring now to the figures of the drawing in detail and first, particularly, to FIG. 1 thereof, there is seen an elevational view of two interengaging impellers with a section outline of the sidewalls of a housing and a diagrammatic view of a drive system. The fluid pump is a double impeller system, with a first impeller 9A driven by a first gear 14A and a second impeller 9B driven by a second gear 14B. The impeller embodiment is a positive displacement system and, at the same time, a back-pressure membrane. As the ribbed impellers rotate, the fluid flow 11 (e.g., air, liquid, hydraulic fluid) is "packaged" into chamber 30 formed between a cylindrical impeller axle 31, a housing wall 20, and a blade 9B. Each impeller has a respective blade 9A and 9B.

Following the helical path of the chamber 30, each chamber formed between the turns of the blade 9B is closed off by the blade 9A of the adjacent impeller structure. Depending on the rotational speed of the impeller system and the size of the chambers 30, the impellers 9A and 9B form a pressure pump with positive displacement towards a high-pressure chamber. The fluid flow 11 is at a lesser pressure than in the high-pressure chamber, located above the housing in FIG. 1. As the blades 9A and 9B of the impeller rotate, various vertically stacked chambers are opened and closed so that it will result in a positive flow from the bottom to the high-pressure side at the top. At the same time, any pulsations and explosions due, for example, to a combustion of fuel in a chamber on the high-pressure side or any other backpressure will be prevented from flowing back past the blades 9A and 9B. In other words, the impeller pump is always closed with regard to a direct backflow of the fluid out from the high-pressure side.

The impellers 9A and 9B may be driven at variable speed. In order to synchronize the blades 9A and 9B, they are connected via gear wheels 14A and 14B, respectively, connected to their axles 31. A drive 26 is diagrammatically illustrated towards the left of the gear 14A. The drive 26 may be, for example, a gear of a toothed rack, an electrical motor, a feedback system driven by the output of the axles 31, or any similar controlled drive. Any type of speed control may be implemented for the impeller system. It is also possible, of course, the drive the shafts 31 directly with direct drive motors. The two spindles are engaged with the meshing gear wheels 14A and 14B.

Figure 2:
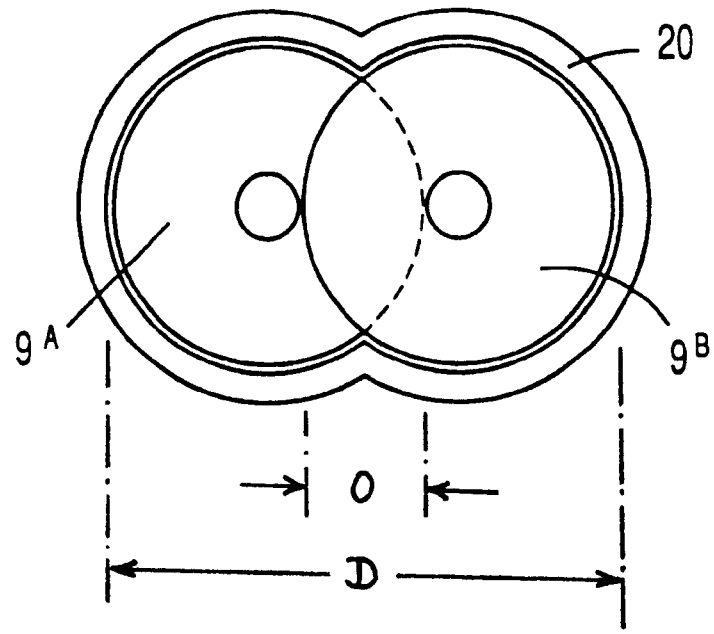
FIG. 2 is a top plan view onto the impeller blades and the housing of FIG. 1.

FIG. 2 is an axial plan view of the impeller system showing the engagement or meshing of the two blades 9A and 9B and the tight placement of the impeller blades inside the walls 20. The positive displacement force of the impeller system is thus only slightly impaired by backflow and leakage between the impeller blades 9A, 9B and the walls 20 and, negligibly, between the axle 31 and the adjacent blade 9A or 9B. The blades 9A and 9B seal tightly against the housing wall 20. In an exemplary embodiment of the novel fluid pump, the spacing between the outer periphery of the blades and the inner surface of the wall is in the range of a few mils, for example 0.1–0.4 mm. Depending on its use, the fluid pump may be additionally sealed with a silicon sealing layer provided on the inside of the housing wall and/or on the periphery of the blades 9A and 9B.

Figure 3:
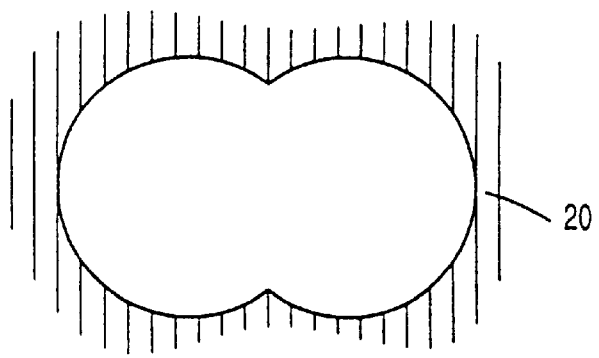
FIG. 3 is a plan view of the housing.

With reference to FIGS. 2 and 3, the housing of the positive displacement system is defined by walls 20 with rotationally symmetrical portions. In the illustrated embodiment with the two interengaging impellers, the housing has two intersecting circular arches that essentially correspond to the periphery of the blades 9A and 9B in their engagement position. A width D of the housing opening in which the impeller spindles are rotatably disposed corresponds to a sum of the diameters of the impeller blades 9A, 9B minus the overlap O. The overlap O, in turn, corresponds essentially to the rifling depth of the impellers, i.e., the difference in the radius of the blades 9A, 9B and the radius of the shaft 31. The width D may also be expressed as the sum of two times the diameter d of the shaft 31 plus two times the rifling depth of the impellers.

Figure 4:
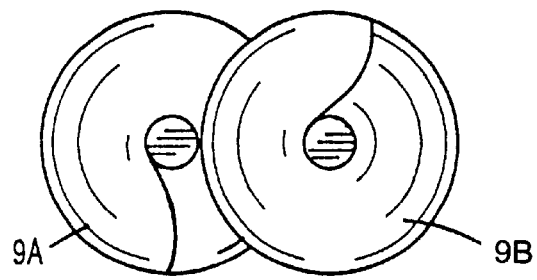
FIG. 4 is a plan view onto the impeller blades.
Figure 5:
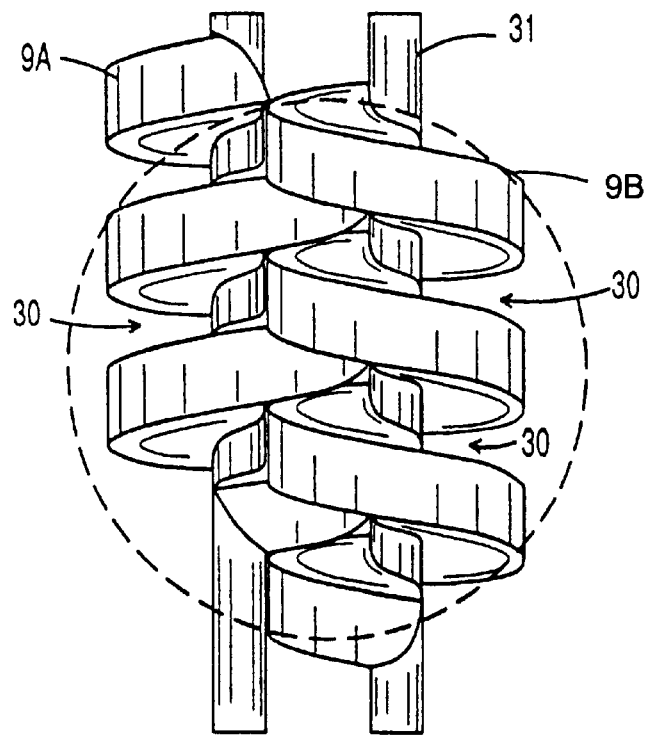
FIG. 5 is a side view of two mutually interengaging blade structures.

As seen in FIGS. 4 and 5, the blades or helical rifling of the blades is offset by approximately 180° so as to distribute the pumping discharge of each of the chambers 30 into the high-pressure side. In other words, it is advantageous for the chambers 30 to reach the top position at which they empty into the high-pressure side alternatingly. In the case of two blades, the offset should thereby be in the neighborhood of 180°.

If three or more impeller spindles are used, the housing 20 requires a corresponding modification and, advantageously, the rotary offset of the impeller rifling may be distributed accordingly by 360°/n, where n is the number of impeller spindles.

Figure 6:
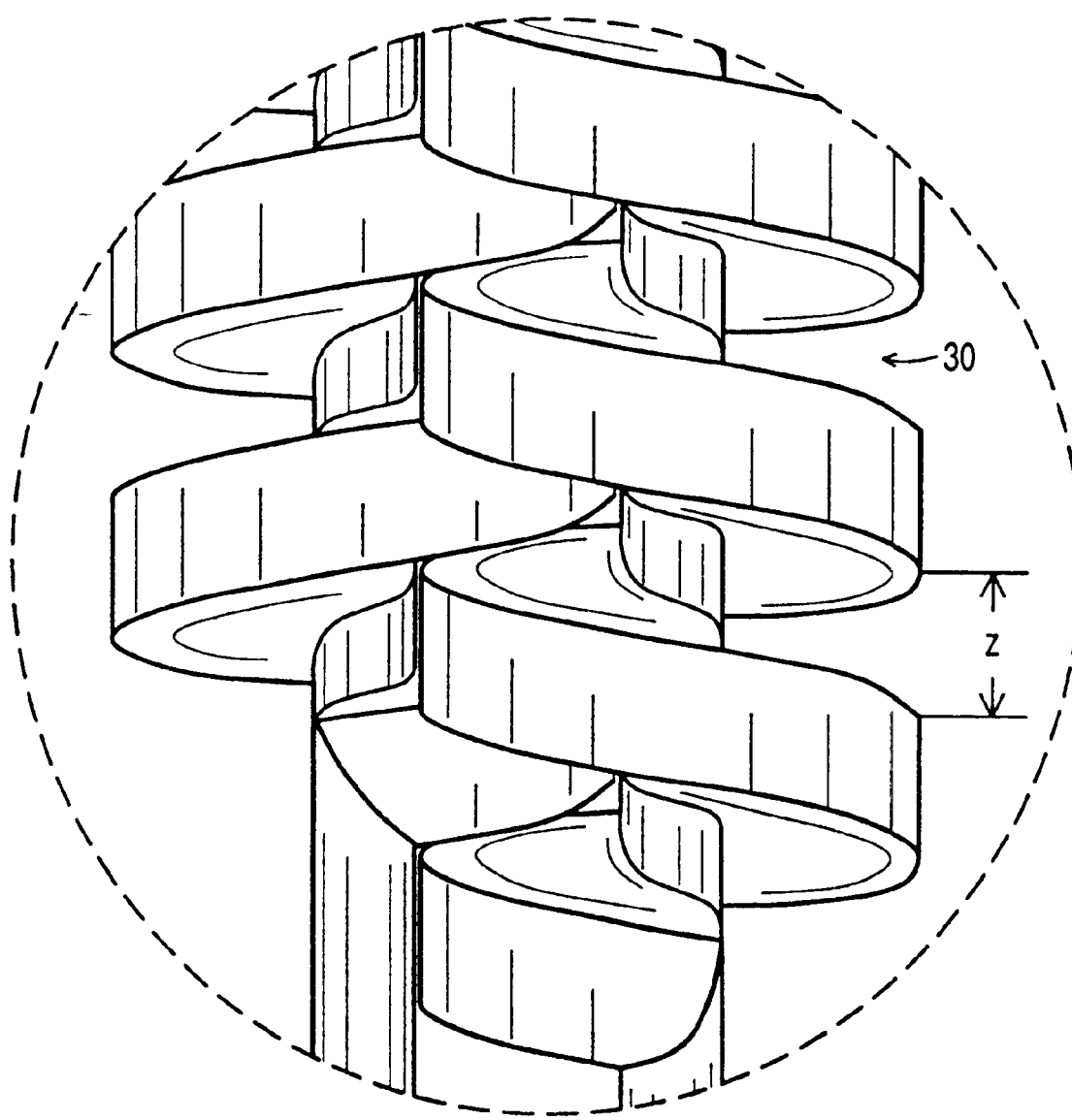
FIG. 6 is an enlarged view of the detail indicated in FIG. 5.

The volume of the chambers 30 and the rotational speed of the impellers defines the pump pressure and the volume displacement per time of the impeller injection. With reference to FIG. 6, the volume of each chamber 30 corresponds approximately to the double integral of the differential rotary angle dθ taken through 360° and the differential radius dr taken from the radius r of the shaft 30 to the radius R of the impeller blade 9A, 9B, multiplied with the blade spacing z, minus the volume portion of the adjacent blade that engages into the space in the center between the two spindles.

Figure 7:
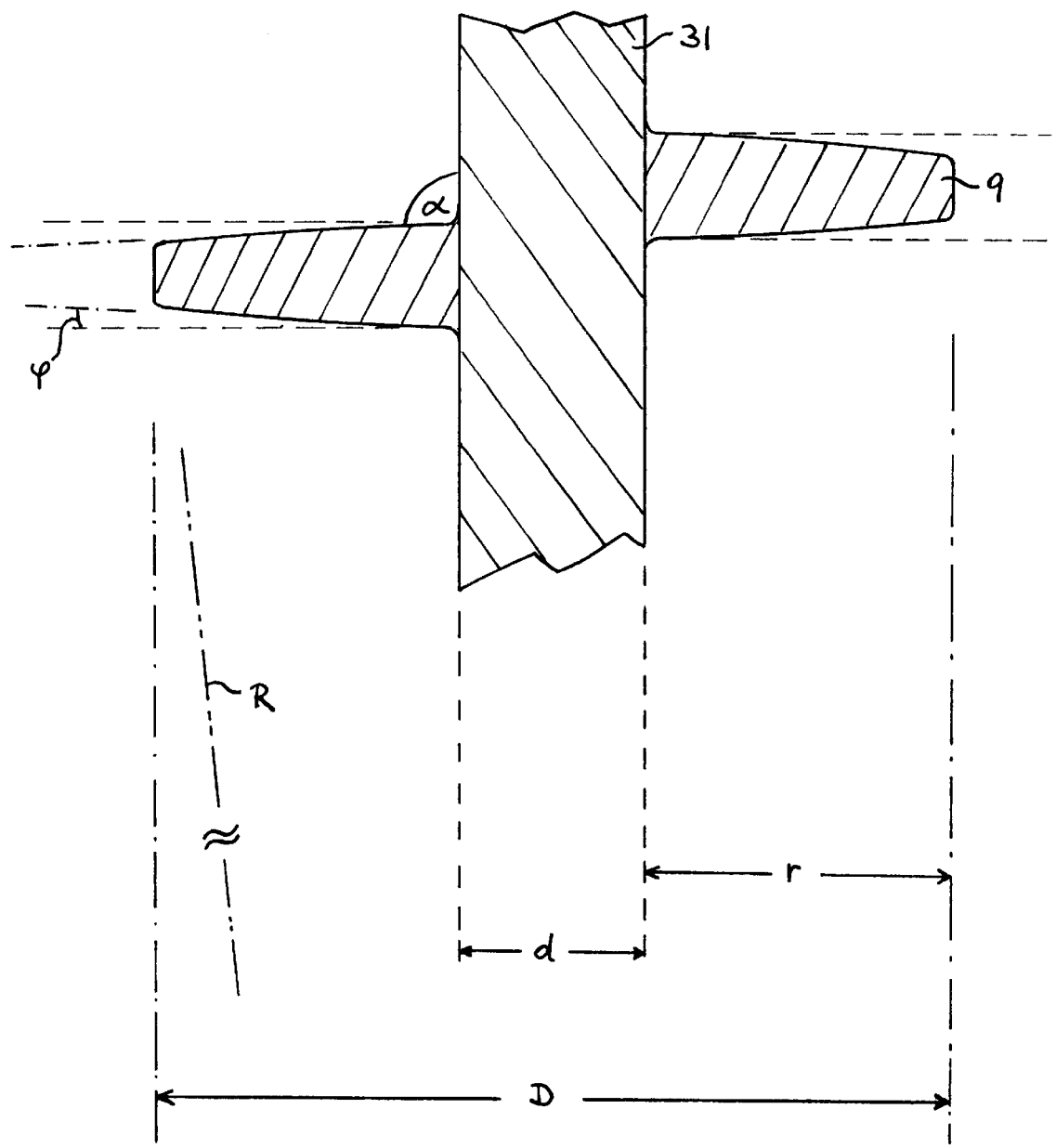
FIG. 7 is an axial section through the axle and a blade of a preferred embodiment of the invention.

In order to maximize the seal between the blades, and thus the seal of the backflow-preventing wall, the blades 9A and 9B are modified in terms of their curvature. In that regard, the illustration in FIGS. 1, 5, and 6 is simplified to show the blades with a constant thickness from the axle 31 to their peripheries. With reference to FIG. 7, which is a sectional view taken diagonally through the center of the axle 31 of one of the impellers, the blades are curved from the axle outward with regard to their thickness. The measurements and relationships among the various dimensions are best illustrated with reference to a specific example.

In the exemplary embodiment, the blades 9 have a diameter D=125 mm (5 in). The axle 31 has a diameter d=25 mm (1 in). The radius r of the blades, therefore, is r=50 mm (2 in), measured from the periphery of the axle 31 to their outer periphery. The rise angle of the helically winding blades 9 is about 7°. As an intermediate production step, the blades may be tapered by a taper angle φ=3°. That is, the angle α formed between the peripheral wall of the axle 31 and the blade 9 is α=90°+φ=93° at the top and at the bottom. Furthermore, the blades 9 are curved from the inside out with a radius of curvature R=400 mm (16 in). The position of the origin of the radius R (i.e., the center of the arc) is defined by the angle φ. For instance, if φ=0, then the blades are not tapered, and the origin of R lies on the peripheral wall of the axle 31. If the blades are tapered with φ=0, then the origin of R is moved into the axle 31 by the appropriate amount defined by the angle φ. By modeling the novel shape of the blades, the inventor has been able to confirm that a proper and superior seal is created between the interengaging impellers.

Figure 8:
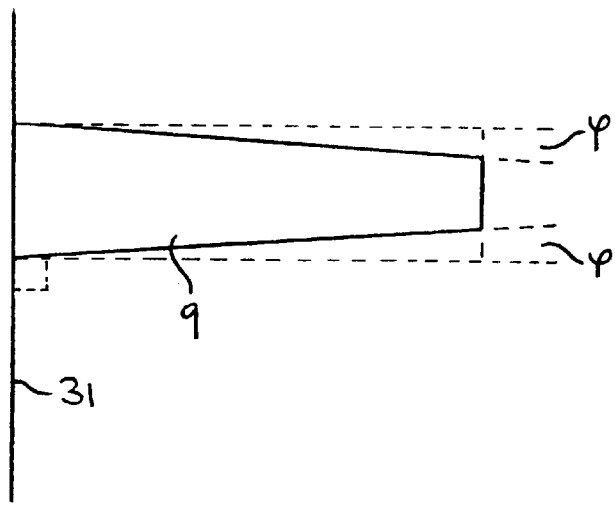
FIG. 8 is a diagrammatic sectional view of an alternative embodiment of the blade structure.

FIG. 8 illustrates an alternative in which the blades 9 are only tapered with the angle φ. The surfaces are not rounded. In a preferred embodiment of this alternative, the angle φ=3°.

Figure 9:
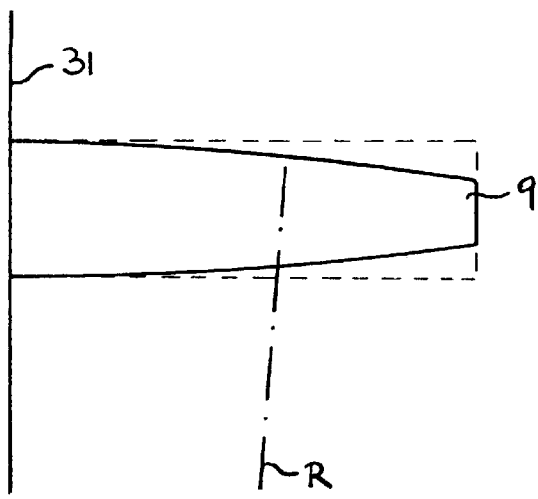
FIG. 9 is a diagrammatic sectional view of a further alternative embodiment of the blade structure.

FIG. 9 illustrates yet another alternative. Here, the blades are not tapered, but only curved. Again, the radius R=400 mm (16 in) and the origin of the arc lies on the peripheral wall of the axle 31. Accordingly, the intersection angle α between the blade 9 and the axle 31 is α=90°.

Figure 10:
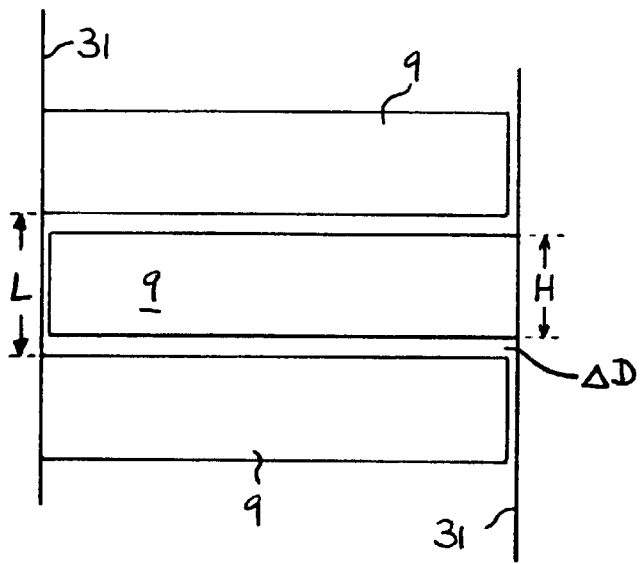
FIG. 10 is a diagrammatic section view of yet another alternative embodiment of the blade structure.

FIG. 10 illustrates a further variation. Here, the inventor recognized that certain fluids (usually lower viscosity fluids) require a less proper seal between the blades. Accordingly, here, a spacing L between the blade windings which defines the lead of the impeller, is greater than a thickness H of the blade 9 (note that the distance L is not the lead of the helical winding, the lead would be defined by the spacing L plus the height of the blade, i.e., L+H). Here, the difference is ΔD=(L−H)/2. The reduction from the spacing L to the thickness H may be from 80% to as much as 50%. In other words, a ratio L/H may range from 5/4 to 2. In the embodiments with the blade taper and/or the curvature defined by the radius R, the parameters L and H must be defined in dependence on the distance r from the axle 31. That is, in that case, ΔD=L(r)−H(r) and the spacing L and the height H of the blade 9 is preferably chosen such that ΔD is constant.

Figure 11:
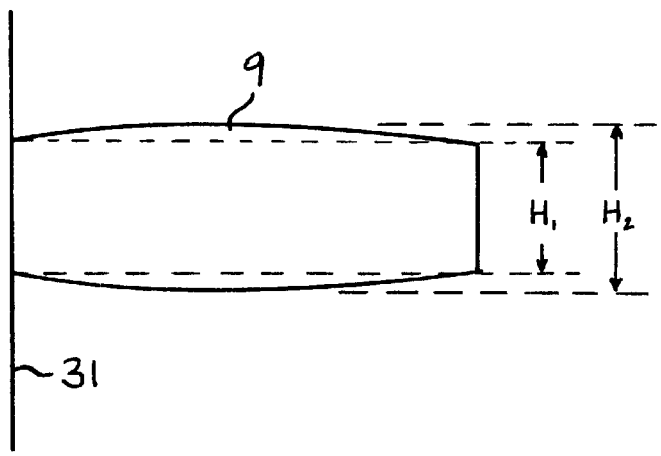
FIG. 11 is a diagrammatic sectional view of another alternative embodiment of the blade structure.
Figure 12:
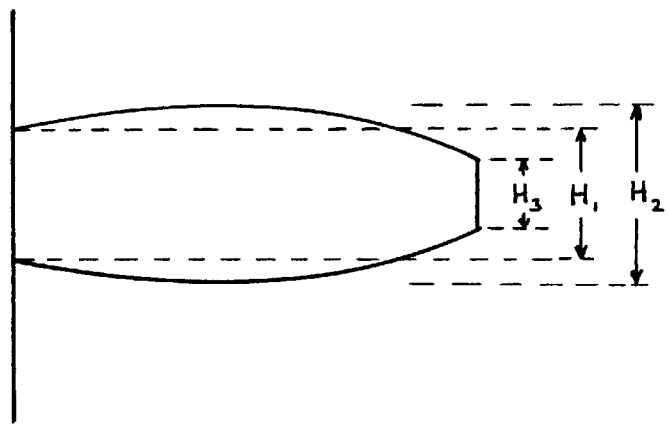
FIG. 12 is a diagrammatic sectional view of yet another alternative embodiment of the blade structure.

FIGS. 11 and 12 illustrate yet a further variation of the inventive concept. In FIG. 11, the blades 9 have a bulge in section. That is, the height H of the blade varies from $H_1$ at the axle 31 to $H_2$ at approximately half its radial extent, and then returns to the height $H_1$ at its outer periphery. The embodiment of FIG. 12 is similar, except the blade 9 thins considerably at its outer periphery, to a height $H_3 < H_1 < H_2$.

Figure 13:
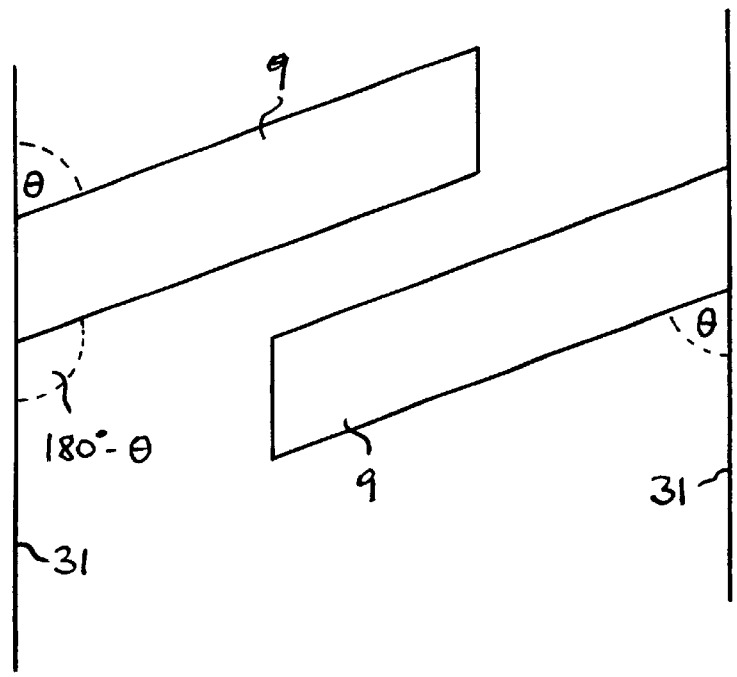
FIG. 13 is a diagrammatic sectional view of an alternative orientation of the blade structure.

The embodiment illustrated in FIG. 13 provides for an attack angle θ between the blade 9 and the axle which is different from 90°. In a preferred embodiment, the angle θ=70°. It should be understood that the embodiment with the non-orthogonal orientation of the blades, i.e., the angle θ≠90°, is not exclusive of the rounded and/or tapered variations that are illustrated in FIGS. 8, 9, 11 and 12. Further, the increased spacing ΔD illustrated in FIG. 10 may be utilized in this embodiment as well.

Figure 14:
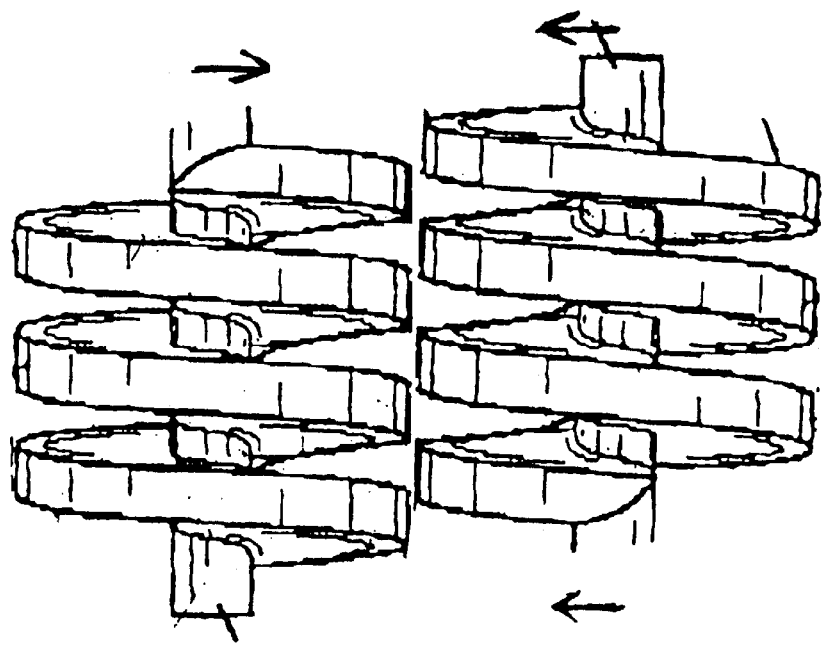
FIG. 14 is an elevational view of two equal orientation impeller blades prior to interengagement.
Figure 15:
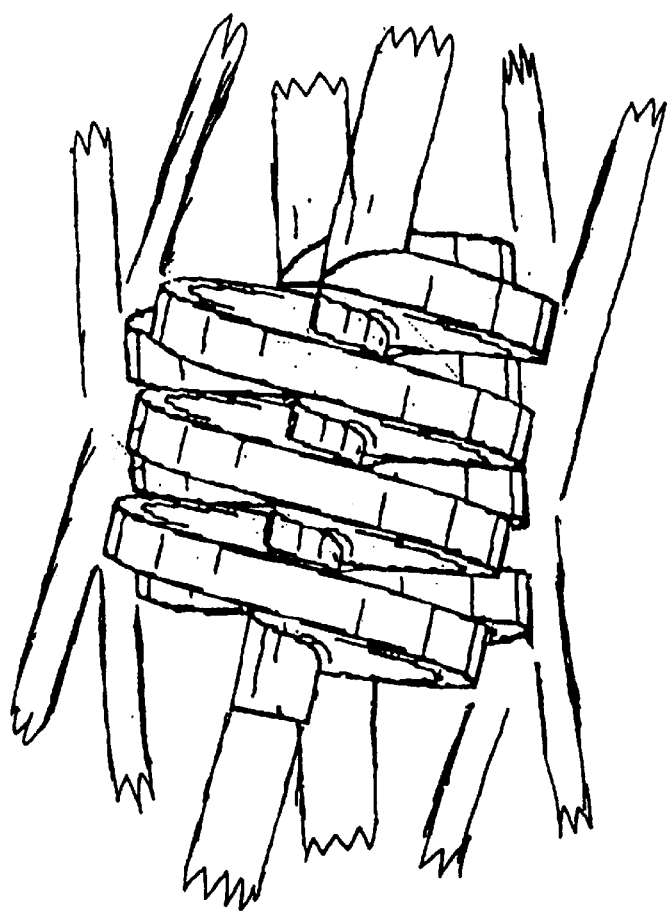
FIG. 15 is an elevational view thereof, after the two blades have been inserted into one another.

It will be understood that, of a pair of blades, one may be right-wound and the other may be left-wound. In that case, a counter-rotation of the two blades leads to a rise of both of the spaces 30. If the two blades are wound in the same sense, then the blades will be rotated in the same direction. In the former case, however, a substantially reduced amount of friction will result between the two sets of blades. Also, if the adjacent blades rise in the same sense, the axes must be offset from parallel by twice their lead angle. This illustrated diagrammatically in FIGS. 14 and 15.

I claim:

1. A fluid displacement pump, comprising:
   a housing formed with a chamber having a wall defined by two mutually intersecting cylindrical openings defining respective cylinder axes; and
   two axles respectively disposed at and rotatably mounted about respective axes coaxial with said cylinder axes, said axles each carrying a helically rising blade sealing against said wall of said housing and engaging into one another;
   said blades having a decreasing thickness from said axles to an outer periphery thereof, and a convex rounded surface extending from said axle outward.

2. The pump according to claim 1, wherein said rounded surface is defined by a radius of curvature in a radial section of said blades, said radius being greater than a diameter of said blades.

3. The pump according to claim 2, wherein said radius of curvature is approximately three times the diameter of said blades.

4. The pump according to claim 1, wherein said blade on each of said axles has a helical rise of approximately 7° and said blades are substantially trapezoidal in radial section from said axle to a periphery thereof.

5. The pump according to claim 1, wherein said blades are formed such that a counter-rotation of two interengaging blades results in a rising displacement of said blades.

6. The pump according to claim 1, wherein said axles are cylindrical axles.

7. The pump according to claim 1, wherein said blades engage into one another so as to form a substantially completely closed wall within said chamber during a rotation of said axles.

8. The pump according to claim 1, wherein said cylinder axes and said axles are parallel to one another.

9. The pump according to claim 1, wherein said axles enclose a given angle with one another, and said given angle corresponds to twice a rise angle of said blades.

10. A fluid displacement pump, comprising:

a housing formed with a chamber having a wall defined by two mutually intersecting cylindrical openings defining respective cylinder axes; and two axles respectively disposed at and rotatably mounted about respective axes coaxial with said cylinder axes, said axles each carrying a helically rising blade sealing against said wall of said housing and engaging into one another;

said blades having a decreasing thickness from said axles to an outer periphery thereof, and a non-concave surface extending from said axle to the outer periphery thereof.

11. The pump according to claim 10, wherein said blades are trapezoidal as seen in axial section, with mutually opposite surfaces steadily merging towards one another from said axle to the outer periphery.

12. The pump according to claim 10, wherein said axles are cylindrical axles.

13. The pump according to claim 10, wherein said blades engage into one another so as to form a substantially completely closed wall within said chamber during a rotation of said axles.

14. The pump according to claim 10, wherein said cylinder axes and said axles are parallel to one another.

15. A fluid displacement pump, comprising:

a housing formed with a chamber having a wall defined by two mutually intersecting cylindrical openings defining respective cylinder axes; and two axles respectively disposed at and rotatably mounted about respective axes coaxial with said cylinder axes, said axles each carrying a helically rising blade sealing against said wall of said housing and engaging into one another;

said blades having a convex surface extending from said axle to the outer periphery thereof.

* * * * *